(12) United States Patent
Lv et al.

(10) Patent No.: US 11,945,931 B1
(45) Date of Patent: Apr. 2, 2024

(54) RECYCLABLE NANO COMPOSITE AS WELL AS PREPARATION METHOD AND APPLICATION THEREOF

(71) Applicant: SUZHOU INSTITUTE OF NANO-TECH AND NANO-BIONICS (SINANO), CHINESE ACADEMY OF SCIENCES, Suzhou (CN)

(72) Inventors: Weibang Lv, Suzhou (CN); Shuxuan Qu, Suzhou (CN); Jiaqi Xi, Suzhou (CN)

(73) Assignee: SUZHOU INSTITUTE OF NANO-TECH AND NANO-BIONICS (SINANO), CHINESE ACADEMY OF SCIENCES, Suzhou (CN)

(*) Notice: Subject to any disclaimer, the term of this patent is extended or adjusted under 35 U.S.C. 154(b) by 0 days.

(21) Appl. No.: 18/280,250

(22) PCT Filed: Dec. 1, 2021

(86) PCT No.: PCT/CN2021/134693
§ 371 (c)(1),
(2) Date: Sep. 4, 2023

(87) PCT Pub. No.: WO2023/029257
PCT Pub. Date: Mar. 9, 2023

(30) Foreign Application Priority Data

Aug. 31, 2021 (CN) .......................... 202111010476.X

(51) Int. Cl.
| | | |
|---|---|---|
| *C08K 3/04* | (2006.01) | |
| *C08K 3/08* | (2006.01) | |
| *C08K 3/22* | (2006.01) | |
| *C08K 3/38* | (2006.01) | |
| *C08K 7/06* | (2006.01) | |
| *C08K 9/00* | (2006.01) | |

(52) U.S. Cl.
CPC ................ *C08K 3/041* (2017.05); *C08K 3/08* (2013.01); *C08K 3/22* (2013.01); *C08K 3/38* (2013.01); *C08K 7/06* (2013.01); *C08K 9/00* (2013.01); *C08K 2003/0806* (2013.01); *C08K 2003/2227* (2013.01); *C08K 2003/385* (2013.01); *C08K 2201/001* (2013.01); *C08K 2201/011* (2013.01); *Y02W 30/62* (2015.05)

(58) Field of Classification Search
CPC ...... C08K 3/04; C08K 3/38; C08K 2003/382; C08K 2003/835; C08K 2003/2227; C08K 9/00; Y02W 30/62
See application file for complete search history.

(56) References Cited

U.S. PATENT DOCUMENTS

2018/0282659 A1* 10/2018 Kumar Tompala .........................
C10M 125/02

FOREIGN PATENT DOCUMENTS

| CN | 103242509 A | 8/2013 |
|---|---|---|
| CN | 103254406 A | 8/2013 |
| CN | 103483554 A | 1/2014 |
| CN | 103665427 A | 3/2014 |
| CN | 103694140 A | 4/2014 |
| CN | 104527177 A | 4/2015 |
| CN | 105754515 A | 7/2016 |
| CN | 112700908 A | 4/2021 |
| CN | 113698733 A | 11/2021 |
| JP | 2021014518 A | 2/2021 |
| WO | 2017171753 A1 | 10/2017 |

* cited by examiner

*Primary Examiner* — Brieann R Johnston
(74) *Attorney, Agent, or Firm* — Bayramoglu Law Offices LLC

(57) ABSTRACT

A recyclable nano composite, a preparation method, and an application thereof are provided. The preparation method includes providing a reinforcement material including a conductive material, or, a combination of the conductive material and an insulating material; directly mixing the reinforcement material with a matrix material, or, molding the reinforcement material to form a film, fiber or three-dimensional network structure formed by the reinforcement material, and then compounding the film, fiber or three-dimensional network structure with the matrix material to obtain the recyclable nano composite. The present disclosure further discloses a recycling method of a reinforcement material. The recyclable nano composite provided by the present disclosure has high strength, high toughness, conductivity, electromagnetic shielding and other properties; furthermore, by simple treatment, the reinforcement material can be recycled.

15 Claims, 1 Drawing Sheet

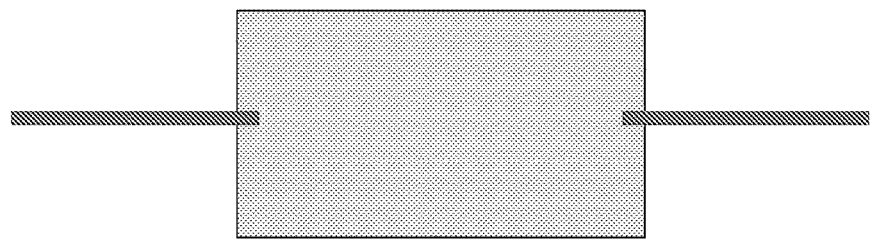
FIG. 1
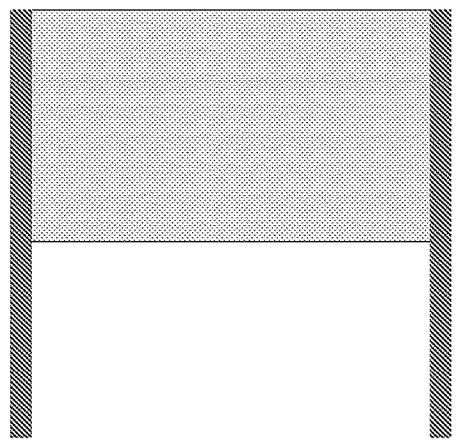
FIG. 2
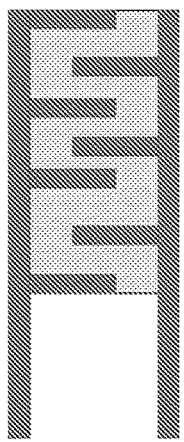 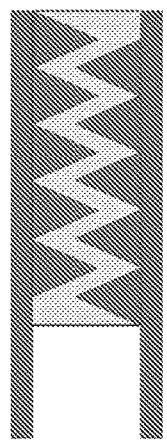 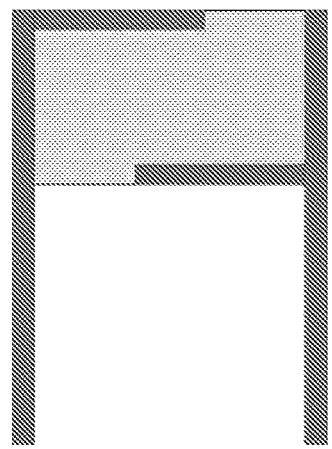
FIG. 3A             FIG. 3B             FIG. 3C

RECYCLABLE NANO COMPOSITE AS WELL AS PREPARATION METHOD AND APPLICATION THEREOF

CROSS REFERENCE TO THE RELATED APPLICATIONS

This application is the national phase entry of International Application No. PCT/CN2021/134693, filed on Dec. 1, 2021, which is based upon and claims priority to Chinese Patent Application No. 202111010476.X, filed on Aug. 31, 2021, the entire contents of which are incorporated herein by reference.

TECHNICAL FIELD

The present disclosure relates to nano composites, particularly to a recyclable nano composite as well as a preparation method and application thereof, belonging to the technical field of nano composites.

BACKGROUND

Composites have been widely applied to the fields of aerospace, ships, automobiles and sports goods. Although CFRPs have many advantages, their increasingly widespread application will also generate more and more carbon fiber cloth waste. Common waste sources include expired prepregs, manufacturing shut-off valves, testing materials, production tools, and end-of-life materials. The composites themselves are difficult to recycle, because (i) their composite components (fibers, matrices, and fillers), (ii) the properties of cross-linked thermosetting resins (which cannot be reshaped), and (iii) their combinations with other materials (metal fasteners, honeycomb structures, hybrid composite materials, etc.). Currently, the wastes of the most carbon fiber composites are disposed through landfilling, but there are many drawbacks, for example ① environmental pollution; ② high manufacturing costs, inability to recycle, and low material utilization rate. At present, some methods for recycling composite materials have also been developed, such as high-temperature treatment, crushing, chemical methods, etc. These methods can cause damage or shortened length or surface defects of carbon fibers, thereby reducing the carbon fiber recycling value.

To sum up, the existing process is mainly applied to the recycling of fibers in carbon fibers or glass fiber composites. During the recycling, problems such as shortened fibers, fiber damage, and reduced original fiber performance can occur, resulting in the recycled fibers being only used in materials with low mechanical performance requirements, thereby reducing the significance of material recycling.

SUMMARY

The main objective of the present disclosure is to provide a recyclable nano composite as well as a preparation method and application thereof in order to overcome the defects in the prior art.

In order to realize the objective of the present disclosure, the technical solution adopted by the present disclosure comprises:

The embodiments of the present disclosure provide a preparation method of a recyclable nano composite, comprising:
providing a reinforcement material including a conductive material, or, a combination of the conductive material and an insulating material, the conductive material comprising a combination of any one or more than two of a carbon nanotube, graphene, a nano carbon fiber and a silver nano wire, wherein the conductive material forms a continuous network structure;
compounding the reinforcement material with the matrix material to obtain the recyclable nano composite.

In some embodiments, the preparation method comprises: directly mixing the reinforcement material with a matrix material, or, molding the reinforcement material and then compounding the molded reinforcement material with the matrix material.

In some embodiments, the preparation method specifically comprises: molding the reinforcement material to form a film, fiber or three-dimensional porous network structure formed by the reinforcement material; and then compounding the film, fiber or three-dimensional porous network structure with the matrix material.

The embodiments of the present disclosure further provide the recyclable nano composite prepared by the above-mentioned method, comprising: a matrix material, and a reinforcement material evenly dispersed into the matrix material, wherein the content of the reinforcement material in the recyclable nano composite is 0.1-80 wt %.

The embodiments of the present disclosure further provide a recycling method of a reinforcement material, comprising:
performing high-temperature treatment on the recyclable nano composite for 1-6 h in air at 200-400° C. in an air atmosphere, then further treating for 1-10 h at 600-2000° C. in a protective atmosphere to obtain the recycled reinforcement material;
or, evenly mixing the recyclable nano composite with a solvent capable of dissolving a matrix material and performing heating reflux for 2-24 h, filtering, collecting the obtained reinforcement material and drying, followed by further treating for 1-10 h at 600-2000° C. in a protective atmosphere to obtain the recycled reinforcement material;
or, selecting two points from at least local areas of the recyclable nano composite as electrode connection points, and connecting electrodes; applying voltages to two ends of the electrodes, and then electrically heating the recyclable nano composite so as to remove the matrix material by using self ohmic heating, wherein the power density of the electrical heating is 500-20000 W/m².

Compared with the prior art, the present disclosure at least has the beneficial effects:

1) the recyclable nano composite provided in the present disclosure uses carbon nanotubes, graphene, carbon nano fibers, silver nano wires and the like as the reinforcements for the composites, and the polymer as the matrix, and such the novel nano composite has high strength, high toughness, conductivity, electromagnetic shielding and other properties due to the structural characteristics of the nano material;

2) the recycling process provided in the present disclosure is used for the recycling of reinforcement in novel nano composites, the reinforcement can be recycled via simple treatment without damaging the structure of the reinforcement, the recycled reinforcement still remains high performance, and the reused composite has performance comparable to that of the original composite;

3) the recycled nano materials in the present disclosure can be used to prepare composites in other forms, such as composites prepared by mixing powdered graphene with resins, graphene after recycling can be prepared into films and then prepared into composites, with more excellent mechanical properties.

BRIEF DESCRIPTION OF THE DRAWINGS

In order to provide a clearer explanation of the technical solution of the present disclosure, a brief introduction will be given to the accompanying drawings required in the embodiments or existing technical descriptions. It is evident that the accompanying drawings described below are only some embodiments of the present invention. For persons of ordinary skill in the art, other accompanying drawings can be obtained based on these drawings without any creative effort.

FIG. 1 is a diagram of a connection manner of two point electrodes in a typical embodiment of the present disclosure;

FIG. 2 is a diagram of a connection manner of two strip-shaped electrodes in a typical embodiment of the present disclosure; and FIG. 3A-FIG. 3C are diagrams of connection manners of two irregular electrodes in a typical embodiment of the present disclosure, respectively.

DETAILED DESCRIPTION OF THE EMBODIMENTS

In view of the defects in the prior art, the inventor of this case has been able to propose the technical solution of this application through long-term research and extensive practice, aiming to propose a recyclable carbon nanotube composite material. Carbon nanotubes can be recycled through simple processing, and the recycled carbon nanotube composite material still maintains high mechanical properties. Next, further explanations and explanations will be made on the technical solution, its implementation process, and principles.

A carbon nanotube composite is a new generation of composite which uses a carbon nanotube as a reinforcement and a thermosetting or thermoplastic resin as a matrix. Since the carbon nanotube has excellent mechanical properties, the carbon nanotube composite has good mechanical properties. In addition, the carbon nanotube has high conductivity, low density, electrochemical activity and other functional characteristics due to its special structure, thus it has significant advantages for developing a structure-function integrated composite.

A preparation method of a recyclable nano composite provided by one aspect of the embodiment of the present disclosure comprises:
  providing a reinforcement material comprising a conductive material, or a combination of the conductive material and an insulating material, wherein the conductive material forms a continuous network structure; and
  compounding the reinforcement material with the matrix material to obtain the recyclable nano composite.

Further, the conductive material includes but is not limited to a combination of any one or more than two of a carbon nanotube, graphene, a nano fiber and a silver nano wire.

Further, the insulating material comprises boron nitride, aluminum oxide, etc., but is not limited thereto, or can also be other functional materials.

In some embodiments, the preparation method comprises: directly mixing the reinforcement material with the matrix material, or, molding the reinforcement material and then compounding the molded reinforcement material with the matrix material.

In other words, the compounding method comprises: ① directly mixing the reinforcement material with the matrix material; and ② molding the reinforcement material, such as a film, a fiber, or a three-dimensional network structure, and then compounding the molded reinforcement material with the matrix material.

Specifically, in some more preferred embodiments, the first compounding manner in the preparation method specifically comprises:
  dispersing the reinforcement material into an organic solvent to form a solution containing the reinforcement material; and
  then adding the matrix material into the solution containing the reinforcement material, and then curing and molding to obtain the recyclable nano composite.

Further, the first direct mixing method in the preparation method further comprises:
  directly dispersing the reinforcement material into the solution containing the matrix material through any one of three-roller grinding or stirring and other manners, and then curing and molding to obtain the recyclable nano composite.

Further, the solution containing the matrix material comprises the matrix material and the organic solvent.

Further, the organic solvent is a solvent capable of dissolving the matrix material, preferably including a combination of any one or more than two of acetone, dimethyl formamide (DMF), methylpyrrolidone (NMP) and the like, but is not limited thereto.

Further, the concentration of the reinforcement material in the solution containing the reinforcement material is 0.1 wt %-5 wt %.

Further, a mass ratio of the reinforcement material to the matrix material is 0.001:1-4:1.

Further, the preparation method comprises: curing and molding through any one of a solvent volatilization method, a coating method and a mold method.

Specifically, in some more preferred embodiments, the second compounding manner in the preparation method specifically comprises:
  molding the reinforcement material to for example form a film, fiber or three-dimensional porous network structure formed by the reinforcement material; and
  then compounding the film, fiber or three-dimensional network structure with the matrix material.

Further, the thickness of the formed film is 5-500 μm, and the diameter of the fiber is 5-500 μm.

Further, the preparation method comprises: molding the reinforcement material by at least using any one of a chemical vapor deposition method, an array spinning method, a wet spinning method, a melt spinning method, a vacuum filtration method, a coating method, a template method, a sol-gel method and a freeze drying method. In the present disclosure, the reinforcement material is first molded, which is beneficial for maintaining the structure of the reinforcement material during the self heating and recycling, and ensuring the recycling quality, avoiding the loss of the reinforcement material caused by traditional processes such as dispersion and filtration in the traditional process.

Further, the preparation method comprises: compounding the matrix material with the reinforcement material by at least using any one of a vacuum perfusion method, a coating method and a hot pressing method to obtain the recyclable nano composite.

In some embodiments, the matrix material comprises polymers preferably comprising a combination of any one or more than two of epoxy resin, bismaleimide, polyimide, cyanate ester, vinyl resin, polyetheretherketone, polyethersulfone and polyurethane, but is not limited thereto.

In some embodiments, the preparation method further comprises: pretreating the reinforcement material prior to compounding the reinforcement material with the matrix material, further, the pretreatment comprises: heating the reinforcement material to 200-450° C. in an air atmosphere and then placing the heated reinforcement material into a diluted hydrochloric acid solution, performing reflux stirring for 2-6 h, and performing high-temperature treatment on the obtained reinforcement material for 1-10 h at 600-2000° C. in an inert protective atmosphere.

Where, the action of the pretreating is to purify the reinforcement material to remove impurities to obtain a high-quality carbon nanotube or graphene. On the one hand, a composite with higher performance can be obtained, and on the other hand, it is convenient to conduct performance comparison with the recycled reinforcement material.

Specifically, in some more preferred embodiments, the pretreating specifically comprises the following steps: first, heating the reinforcement material to 200-450° C. in air and then putting the reinforcement material into a diluted hydrochloric acid solution, performing reflux stirring for 2-6 h, after that, removing diluted hydrochloric acid, washing the reinforcement material with deionized water, and finally performing high-temperature treatment on the reinforcement material for 1-10 h at 600-2000° C. under the protection of an inert gas.

Another aspect of the embodiment of the present disclosure further provides the recyclable nano composite prepared by the above-mentioned method, comprising a matrix material, and a reinforcement material evenly dispersed into the matrix material.

Further, the content of the reinforcement material in the recyclable nano composite is 0.1-80 wt %.

In a novel nano composite provided by the present disclosure, the carbon nanotube or graphene is used as the reinforcement of the composite, and a polymer is used as a matrix. Due to the structural features of the carbon nanotube or graphene, such the novel nano composite has high strength, high toughness, high conductivity, electromagnetic shielding and other properties.

Another aspect of the embodiment of the present disclosure further provides a recycling method of a reinforcement body, comprising:

performing high-temperature treatment on the recyclable nano composite for 1-6 h at 200-400° C. in an air atmosphere, and then further treating for 1-10 h at 600-2000° C. in a protective atmosphere to obtain the recycled reinforcement material;

or, evenly mixing the recyclable nano composite with a solvent capable of dissolving a matrix material and performing heating reflux for 2-24 h, filtering, collecting the obtained reinforcement material and drying, followed by further treating for 1-10 h at 600-2000° C. in a protective atmosphere to obtain the recycled reinforcement material;

or, selecting two points from at least local areas of the recyclable nano composite as electrode connection points, and connecting electrodes; and applying voltages to two ends of the electrodes, and then electrically heating the recyclable nano composite so as to remove the matrix material by using self ohmic heating, wherein the power density of the electrical heating is 500-20000 W/m².

In other words, the recycling method of the reinforcement material comprises ① a high-temperature treatment method, ② a solvent dissolution method, and ③ an ohmic heating method. Specifically, the high-temperature treatment method comprises: putting a nano composite into a high-temperature furnace, performing high-temperature treatment for 1-6 hours at 200-400° C. in air, and then treating for 1-10 h at 600-2000° C. in a protective atmosphere to obtain the recycled reinforcement material. Specifically, the solvent dissolution method comprises: putting the nano composite into a solution capable of dissolving the matrix material, stirring, performing heating reflux for 2-24 hours, then recycling the reinforcement material through a filtration method and a centrifuge method, drying the reinforcement material, followed by treating for 1-10 h at 600-2000° C. in a protective atmosphere to obtain the recycled reinforcement material.

Wherein, conductive materials, such as a carbon nanotube, graphene, a nano carbon fiber and a silver nano wire, have excellent conductive property. A high temperature of 200-400° C. is obtained by electrifying the composite via its electrothermal effect so as to achieve the removal of the matrix material, and finally the recycled reinforcement material is obtained by further self heating to 600-2000° C. in a protective atmosphere.

In other words, the high-temperature recycling treatment method specifically comprises the following steps: mixing one or more of a carbon nanotube, graphene, a nano carbon fiber, a silver nano wire and other conductive materials to prepare a film, a fiber or a three-dimensional network structure. Such the structure has a uniform and continuous conductive path. A resin is compounded with the reinforcement material by a vacuum perfusion method, a coating method and a hot pressing method to obtain the composite. During the recycling, two points on the edge of the composite are selected as electrode connection points. The electrodes are connected through conductive silver glue, welding and other methods. A voltage is applied to both ends of the electrodes to electrically heat the composite. Through self ohmic heating, the resin is removed and the reinforcement is recycled. The power density of the ohmic heating is 500-20000 W/m². During the self heating, it can be placed in an inert protective gas or put in air. The recycled reinforcement material has a high weight retention rate and a high mechanical property retention rate, which is conducive to the reuse of the reinforcement material.

Further, there are several electrode connection manners as follows:

(1) two point electrodes (the connection manner is as shown in FIG. 1) can be connected through silver, copper, gold, nickel, and alloy wires thereof, with a connection point size being 0.1 cm²-1 cm²;

(2) two strip-shaped electrodes (the connection manner is as shown in FIG. 2) can be connected through thin silver, copper, gold, nickel, and alloy sheets thereof, with the width of the electrode sheet being 1 mm-30 mm;

(3) two irregular electrodes (the connection manner is as shown in FIGS. 3A-3C) can be comb shaped, toothed, L-shaped, etc.

To sum up, the above-mentioned recycling process provided in the present disclosure is used for the recycling of reinforcement materials in new nano composites. Carbon nanotubes can be recycled through simple processing, which will not damage the structure of the reinforcement material.

The reused composite material has the same performance as the original composite material, and the recycled carbon nanotube composite still remains high mechanical properties.

In addition, the nano materials recycled in the present disclosure can be used to prepare composites in other forms, such as composites prepared by mixing powder graphene with a resin. After recycling, graphene can be prepared into a film, and composites can be prepared to obtain better mechanical properties.

In order to make the purpose, technical solution, and advantages of this application clearer, the following will provide further detailed explanations of the technical solution of this application in conjunction with several specific embodiments. Obviously, the described embodiments are only a part of the embodiments of the present disclosure, but not all the embodiments. Based on the embodiments in the present disclosure, all other embodiments obtained by ordinary technical personnel in this field without creative labor fall within the scope of protection in the present disclosure. The test methods in the following embodiments, which do not specify specific conditions, are all carried out according to conventional conditions. In addition, the technical features involved in the various embodiments of the present disclosure described below can be combined with each other as long as they do not conflict with each other.

Example 1

A carbon nanotube film was prepared by a floating catalytic chemical vapor deposition method. The CNT film was heated to 400° C. in air, then placed in a diluted hydrochloric acid solution, subjected to reflux stirring for 4 h. At the end, the diluted hydrochloric acid was removed, and the CNT film was washed with deionized water. Finally, the CNT film was subjected to high-temperature treatment at 2000° C. under argon protection for 2 h.

The pretreated CNT film was compounded with an epoxy resin through a vacuum injection method to obtain a CNT/epoxy resin composite, with a mass ratio of CNT to epoxy resin being 2:1.

Recycling of CNT film: a toothed electrode was connected with the CNT film, and a voltage of 1-20 V was applied between the two electrodes to obtain the CNT film. Then, the CNT film was treated in argon at 600° C. for 2 h to obtain the recycled CNT film.

The recycled CNT film was compounded with the epoxy resin through the vacuum injection method to obtain the recycled CNT/epoxy resin composite, where the mass ratio of CNT to epoxy resin was 2:1. The tensile strength of the original CNT film was 60 MPa, the tensile strength of the recycled CNT film was 58 MPa, the tensile strength of the CNT/epoxy resin composite was 123 MPa, and the tensile strength of the recycled CNT/epoxy resin composite was 120 MPa.

Example 2

First, carbon nanotubes were dispersed into water to form a carbon nanotube dispersion, and a carbon nanotube fiber was prepared by a wet spinning method. The obtained carbon nanotube fiber was subjected to high-temperature treatment under argon protection at 1000° C. for 1 h.

The CNT fiber subjected to high-temperature treatment was impregnated with polyether-ether-ketone to obtain a CNT/polyether-ether-ketone resin composite, wherein a mass ratio of CNT to polyether-ether-ketone resin was 1:1.

Recycling of CNT fiber: the CNT/PEEK resin composite was placed in a high-temperature furnace, treated in air at 200-400° C. for 1-6 hours, and then treated in argon at 1000° C. for 1 h to obtain the recycled CNT fiber.

The recycled CNT fiber was impregnated with the polyether-ether-ketone resin to obtain the recycled CNT/polyether-ether-ketone resin composite, wherein a mass ratio of CNT to polyether-ether-ketone resin was 1:1. The tensile strength of the original CNT fiber was 500 MPa, and the tensile strength of the recycled CNT fiber was 430 MPa. The tensile strength of the original CNT/polyether-ether-ketone resin composite was 300 MPa, and the tensile strength of the recycled CNT/polyether-ether-ketone resin composite was 320 MPa.

Example 3

First, carbon nanotubes were dispersed into water to form a carbon nanotube dispersion so as to prepare a carbon nanotube three-dimensional network structure. The carbon nanotube three-dimensional network structure is 10×10×10 cm, with a porous structure inside, and the obtained carbon nanotube three-dimensional network was subjected to high-temperature treatment at 600° C. under nitrogen protection for 2 h.

The carbon nanotube three-dimensional network subjected to high-temperature treatment was impregnated with a vinyl resin to obtain a CNT/vinyl resin composite, with a mass ratio of CNT to vinyl resin of 0.001:1.

Recycling of carbon nanotube: the CNT/vinyl resin composite was put into acetone, underwent heating reflux and stirring for 24 h, and then was soaked and centrifuged to obtain CNT. Then, the obtained CNT was treated for 2 h in argon at 2000° C. to obtain the recycled CNT powder.

The recycled CNT powder was dispersed again and prepared into a three-dimensional network structure. The recycled CNT/vinyl resin composite was obtained by impregnating the three-dimensional network structure with the vinyl resin, wherein the mass ratio of CNT to vinyl resin was 0.001:1. The conductivity of the original CNT/vinyl resin composite was 10 S/m, while the conductivity of the recycled CNT/vinyl resin composite was 8 S/m.

Example 4

First, Graphene was heated to 450° C. in air, and then subjected to high-temperature treatment for 2 h at 1500° C. under the protection of nitrogen.

The pretreated graphene was ultrasonically dispersed into DMF, and the polyurethane resin was dissolved into a graphene-DMF solution to prepare a film graphene-PU composite by a solvent evaporation method. The mass ratio of graphene to PU was 1:1.

Recycling of graphene: the graphene-PU composite was put into a solution of DMF, stirred and subjected to heating reflux for 2-24 hours, and then the graphene was recycled by a filtration method. After drying, the dried graphene was treated for 2 h in nitrogen at 2000° C. to obtain the recycled graphene.

The recycled graphene was ultrasonically dispersed into DMF, and the PU resin was dissolved into a graphene-DMF solution, and then a film graphene-PU composite was prepared by a solvent evaporation method. The mass ratio of graphene to PU was 1:1. The tensile strengths of the original graphene and a material obtained by compounding the recycled graphene with PU were tested by using a universal testing machine. The tensile strength of the original graphene-PU composite was 200 MPa, while the tensile strength of the recycled graphene-PU composite was 220 MPa.

Example 5

First, graphene was heated to 200° C. in air, and then subjected to high-temperature treatment at 600° C. for 10 h under the protection of nitrogen.

The pretreated graphene was ultrasonically dispersed into NMP, the polyurethane resin was dissolved into a graphene-NMP solution, and then a film graphene-polyurethane composite was prepared by a solvent evaporation method. The mass ratio of graphene to polyurethane was 4:1.

Recycling of graphene: the graphene-PU composite was put into a solution of NMP, stirred, subjected to heating reflux for 2-24 hours, and then the graphene was recycled through a filtration method. After drying, the dried graphene was treated in nitrogen at 2000° C. for 10 h to obtain the recycled graphene.

The recycled graphene was ultrasonically dispersed into NMP, and the PU resin was dissolved into a graphene-DMF solution, a film graphene-PU composite material was prepared by a solvent evaporation method. The mass ratio of graphene to PU was 4:1. The tensile strengths of the original graphene and a material obtained by compounding the recycled graphene with PU were tested by using a universal testing machine. The tensile strength of the original graphene-PU composite was 600 MPa, while the tensile strength of the recycled graphene-PU composite was 650 MPa.

Example 6

First, the carbon nanotube was heated in air to 450° C. and placed in a diluted hydrochloric acid solution, and then was subjected to reflux stirring for 2 h. After that, the diluted hydrochloric acid was removed and the carbon nanotube was washed with deionized water. Finally, the carbon nanotube was subjected to high-temperature treatment under the protection of nitrogen at 1500° C. for 2 h.

The pretreated carbon nanotubes were dispersed into an epoxy resin by three-roll grinding, and the carbon nanotube/epoxy resin was poured into a mold to be molded to prepare a massive carbon nanotube/epoxy resin composite, wherein the mass ratio of carbon nanotube to epoxy resin was 0.1:1.

Recycling of carbon nanotube: the carbon nanotube/epoxy resin composite was put into a solution of acetone, stirred and subjected to heating reflux for 2-24 hours, and then the carbon nanotubes were recycled through a filtration method. After drying, the dried carbon nanotube was treated in nitrogen at 1500° C. for 2 h to obtain the recycled carbon nanotube.

The recycled carbon nanotubes were dispersed into the epoxy resin by three-roller grinding, and the carbon nanotube/epoxy resin was poured into a mold to be molded to prepare massive carbon nanotube/epoxy resin composite. The mass ratio of carbon nanotube to epoxy resin was 0.1:1.

The tensile strengths of the original graphene and a material obtained by compounding the recycled carbon nanotube with the epoxy resin were tested by using a universal testing machine. The tensile strength of the original carbon nanotube-epoxy resin composite was 180 MPa, while the tensile strength of the recycled carbon nanotube-epoxy resin composite was 165 MPa.

Example 7

Carbon nanotubes were evenly mixed with boron nitride nanosheets and a film was prepared through a coating method, wherein a mass ratio of carbon nanotubes to boron nitride nanosheets was 6:4. The film was soaked into a bismaleimide resin and cured to form a composite.

Recycling of reinforcement: the composite was placed in a nitrogen atmosphere and comb-shaped electrodes were arranged at the maximum-length edge of the composite for ohmic heating. The power density used was 500-20000 W/m$^2$, and the resin in the composite was removed to obtain the reinforcement material.

The reinforcing material was prepared into a film again and compounded with the bismaleimide resin to obtain the recycled composite. The conductivity of the recycled composite tested using a four-wire method was 76 S/m which was comparable to the conductivity of the original composite.

Example 8

Carbon nano fibers were mixed with cyanate ester resins, and a carbon nano fiber/cyanate ester resin was poured into a mold to be molded to prepare a massive carbon nanofiber/cyanate ester resin composite, wherein the mass ratio of carbon nano fibers to cyanate ester resins was 1:1.

Recycling of carbon nano fiber: strip-shaped electrodes were installed on both sides of the carbon nano fiber/cyanate ester resin composite for ohmic heating, and then the cyanate ester resin was removed, so as to ultimately obtain the recycled carbon nano fiber.

The recycled carbon nano fibers were mixed with the cyanate ester resins again and the obtained mixture was poured into a mold to be molded to prepare a massive carbon nano fiber/cyanate ester resin composite, wherein the mass ratio of carbon nano fiber to cyanate ester resin was 1:1.

The tensile strengths of the original carbon nano fibers and a material obtained by compounding the recycled carbon nano fiber with the cyanate ester resin were tested by using a universal testing machine. The tensile strength of the original carbon nano fiber/cyanate ester resin was 520 MPa, and the tensile strength of the recycled carbon nano fiber/cyanate ester resin composite was 550 MPa.

Example 9

Silver nano wires were evenly mixed with alumina nanosheets and a three-dimensional network structure was prepared by a freeze drying method, wherein a mass ratio of silver nano wires to alumina nanosheets was 7:3. Two points on the three-dimensional network structure were selected for installing electrodes to form a conductive path, and the composite was obtained by compounding the vinyl resin with the three-dimensional network structure via a vacuum perfusion method and then curing.

Recycling of reinforcement: the composite was placed in a nitrogen atmosphere, the composite was subjected to ohmic heating with a reserved electrode, and the used power density was 500-20000 W/m$^2$, and then the resin was removed from the composite to obtain the reinforcement material.

The reinforcement material was made into a three-dimensional network structure again and compounded with a vinyl resin to obtain a recycled composite. The conductivity of the recycled composite tested by using the four-wire method was 285 S/m which was comparable to the conductivity of the original composite.

Comparative Example 1

For the traditional carbon fiber composite in this comparative example, the resin was dissolved by using a solvent, or burnt at high temperature, so as to shorten a carbon fiber. During the secondary utilization, the mechanical properties, electrical properties and other functional characteristics of the composite are reduced due to the shortened fiber.

Through the above examples, the recyclable nano composite provided in the present disclosure has high strength, high toughness, conductivity, electromagnetic shielding and other properties; moreover, the reinforcement material therein can be recycled through simple treatment, such the manner does not damage the structure of the reinforcement material, and the reused composite has the same properties as the original composite, and the recycled reinforcement material still remains high mechanical properties.

In addition, the inventor of this case conducted test by reference to above-mentioned examples and by using other raw materials, process operations and process conditions involved in this specification to obtain relatively ideal results.

It should be understood that the above descriptions are only embodiments of the present disclosure and do not limit the patent scope of the present disclosure. Any equivalent structure or equivalent process transformation made by using the content of the specification of the present disclosure, or directly or indirectly applied to other related technical fields, are similarly included in the patent scope of protection of the present disclosure.

What is claimed is:

1. A preparation method of a recyclable nano composite, comprising:
    providing a reinforcement material and conducting a pretreatment, wherein the reinforcement material is a combination of a conductive material and an insulating material, the conductive material is selected from one or a combination of more than two of a carbon nanotube, graphene, a nano carbon fiber, and a silver nano wire, the conductive material forms a continuous network structure; and the insulating material is selected form boron nitride and/or alumina; the pretreatment comprises: heating the reinforcement material to 200-450° C. in an air atmosphere, then placing a heated reinforcement material in a diluted hydrochloric acid solution, performing a reflux stirring for 2-6 h, and performing a high-temperature treatment on a resulting reinforcement material at 600-2000° C. in an inert protective atmosphere for 1-10 h;
    dispersing the reinforcement material into an organic solvent to form a solution containing the reinforcement material, wherein a concentration of the reinforcement material in the solution containing the reinforcement material is 0.1 wt %-5 wt %;
    adding a matrix material into the solution containing the reinforcement material, curing and molding to obtain the recyclable nano composite;
    or, directly dispersing the reinforcement material into a solution containing a matrix material by grinding or stirring, then curing and molding to obtain the recyclable nano composite;
    or, molding the reinforcement material to form a film, a fiber, or a three-dimensional porous network structure formed by the reinforcement material, wherein a thickness of the film is 5-500 μm, and a diameter of the fiber is 5-500 μm; and compounding the film, the fiber, or the three-dimensional porous network structure with a matrix material to obtain the recyclable nano composite, wherein a mass ratio of the reinforcement material to the matrix material is (0.001:1)-(4:1),
    the recyclable nano composite comprises the matrix material and the reinforcement material evenly dispersed into the matrix material, and a content of the reinforcement material in the recyclable nano composite is 0.1-80 wt %.

2. The preparation method according to claim 1, comprising: directly mixing the reinforcement material with the matrix material, or, molding the reinforcement material, and then compounding a molded reinforcement material with the matrix material.

3. The preparation method according to claim 1, comprising:
    curing and molding by one of a solvent volatilization method, a coating method, and a mold method.

4. The preparation method according to claim 1, comprising:
    molding the reinforcement material by using one of a chemical vapor deposition method, an array spinning method, a wet spinning method, a melt spinning method, a vacuum filtration method, a coating method, a template method, a sol-gel method, and a freeze-drying method.

5. The preparation method according to claim 1, comprising: compounding the matrix material with the reinforcement material by using one of a vacuum perfusion method, a coating method, and a hot pressing method to obtain the recyclable nano composite.

6. The preparation method according to claim 1, wherein the matrix material comprises polymers selected from one or a combination of more than two of epoxy resin, bismaleimide, polyimide, cyanate ester, vinyl resin, polyetheretherketone, polyethersulfone, and polyurethane.

7. A recycling method of a reinforcement material, comprising:
    in an air atmosphere, performing a high-temperature treatment on the recyclable nano composite prepared by the preparation method according to claim 1 for 1-6 h at 200-400° C. in the air atmosphere, and then further treating for 1-10 h at 600-2000° C. in a protective atmosphere to obtain a recycled reinforcement material;
    or, evenly mixing the recyclable nano composite prepared by the preparation method according to claim 1 with a solvent capable of dissolving a matrix material and performing a heating reflux for 2-24 h, filtering, collecting an obtained reinforcement material and drying, followed by further treating for 1-10 h at 600-2000° C. in a protective atmosphere to obtain a recycled reinforcement material;
    or, selecting two points from at least local areas of the recyclable nano composite prepared by the preparation method according to claim 1 as electrode connection points, and connecting electrodes; applying voltages to two ends of the electrodes, and electrically heating the recyclable nano composite to remove a matrix material by using a self ohmic heating, wherein a power density of the electrically heating is 500-20000 W/m$^2$.

8. The recycling method according to claim 7, wherein the solvent capable of dissolving the matrix material is selected from one or a combination of more than two of acetone, DMF, and NMP.

9. The preparation method according to claim 1, wherein the organic solvent is a solvent capable of dissolving the matrix material and is selected from one or a combination of more than two of acetone, dimethyl formamide (DMF), and methylpyrrolidone (NMP).

10. The recycling method according to claim 7, wherein the preparation method comprising: directly mixing the reinforcement material with the matrix material, or, molding the reinforcement material, and then compounding a molded reinforcement material with the matrix material.

11. The recycling method according to claim 7, wherein the preparation method comprising: curing and molding by one of a solvent volatilization method, a coating method, and a mold method.

12. The recycling method according to claim 7, wherein the preparation method comprising: molding the reinforcement material by using one of a chemical vapor deposition method, an array spinning method, a wet spinning method, a melt spinning method, a vacuum filtration method, a coating method, a template method, a sol-gel method, and a freeze-drying method.

13. The recycling method according to claim 7, wherein the preparation method comprising: compounding the matrix material with the reinforcement material by using one of a vacuum pouring method, a coating method, and a hot pressing method to obtain the recyclable nano composite.

14. The recycling method according to claim 7, wherein in the preparation method, the matrix material comprises polymers selected from one or a combination of more than two of epoxy resin, bismaleimide, polyimide, cyanate ester, vinyl resin, polyetheretherketone, polyethersulfone, and polyurethane.

15. The recycling method according to claim 7, wherein in the preparation method, the organic solvent is a solvent capable of dissolving the matrix material and is selected from one or a combination of more than two of acetone, dimethyl formamide (DMF), and methylpyrrolidone (NMP).

\* \* \* \* \*